Patented Apr. 23, 1929.

1,709,977

UNITED STATES PATENT OFFICE.

JOSEF HALLER, OF WIESDORF, NEAR COLOGNE-ON-THE-RHINE, GERMANY, ASSIGNOR TO GRASSELLI DYESTUFF CORPORATION, OF NEW YORK, N. Y., A CORPORATION OF DELAWARE.

INDIGOID DYESTUFFS.

No Drawing. Application filed December 9, 1926, Serial No. 153,733, and in Germany January 7, 1926.

The present invention relates to new indigoid dyestuffs of the general formula:

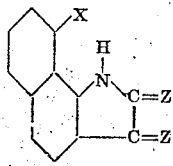

wherein X represents halogen, one Z stands for oxygen and the other Z for an organic residue containing the atom grouping

$C_1$ and $C_2$ being carbon atoms belonging to an aromatic or heterocyclic nucleus. The aromatic nuclei in the above given general formula may be further substituted by mono-valent substituents such as halogen, alkoxyl, a nitro group and so on.

The new dyestuffs are obtainable by causing a 9-halogeno-1-2-naphthisatin which may be obtained by reacting with a condensing metal chloride upon a naphthyloxaminic acid halogenid, derived from a primary naphthylamine and the manufacture of which is described in my co-pending application Ser. No. 151,608 filed November 29, 1926, and which have the probable formula:

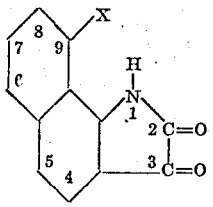

wherein X represents halogen, to react with a compound containing the atom grouping:

$C_1$ and $C_2$ being carbon atoms belonging to an aromatic or heterocyclic nucleus.

The last group includes such compounds as oxythionaphthene, oxindol, indoxyl, acenaphthenone, alpha-anthrol, alpha-naphthol, alpha-hydroxy-anthranol, carbazole and their substitution products.

The following examples will further illustrate my invention, the parts being by weight:

*Example 1.*—25 parts 9-chloro-1-2-naphthisatin (dark red leaflets, melting at 239° C.) are converted in chlorobenzene solution by means of phosphorous pentachloride into the alpha chloride of the formula

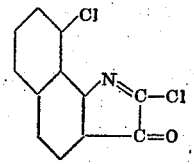

To the so obtained clear solution one adds 20 parts 4-methyl-6-chloro-3-oxythionaphthene and heats the reaction mass until the formation of the dyestuff is completed. The precipitated dyestuff is filtered off and washed with alcohol. It is obtained as a dark violet powder, soluble in concentrated sulfuric acid with a green color. It forms an orange-yellow vat, from which cotton is dyed violet shades of superior fastness to washing, chlorine and light. The dyestuff has most probably the formula

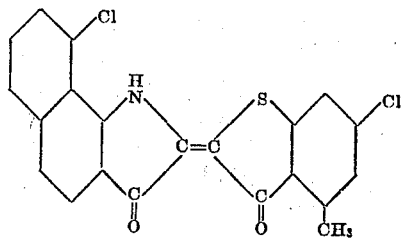

*Example 2.*—11 parts 6-9-dichloro-1-2-naphthisatin which by crystallization from glacial acetic acid is obtained as dark red neddles, melting at 275-278° C., is dissolved in 2000 parts glacial acetic acid, and 8 parts 2-1-naphthoxythiophene, dissolved in 50 parts glacial acetic acid are added. After further addition of 3 parts concentrated hydrochloric acid one heats the reaction mass for a short time. The new dyestuff separates, it is filtered off and washed with water. It dissolves in concentrated sulfuric acid with a violet color and dyes cotton from the vat a beautiful deep olive of excellent fastness properties. It has most probably the formula:

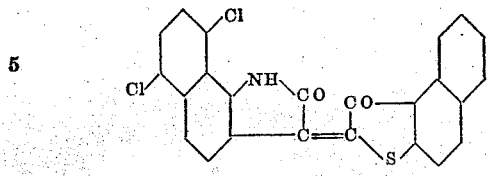

*Example 3.*—31 parts 9-chloro-4-bromo-1-2-naphthisatin, obtained by brominating 9-chloro-1-2-naphthisatin and melting at 297° C., are suspended in chlorobenzene and by means of phosphorous pentachloride converted into the alpha-chloride. After addition of a solution of 18 parts N-acetylindoxyl and a little soda ash, one heats the reaction mass for some time under exclusion of air. After the reaction is complete, the reaction mass is allowed to cool, the dyestuff filtered off and washed with alcohol. It dissolves in concentrated sulfuric acid with a violet color, and forms a yellow vat, from which cotton is dyed greyish-blue shades. It has most probably the formula:

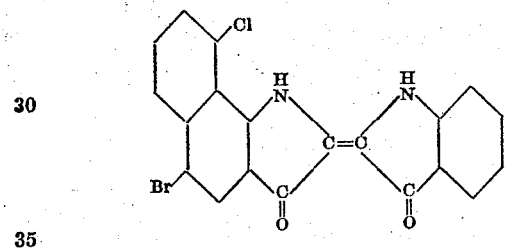

The dyestuff can be further halogenated in the usual manner; the dyeings obtained from such halogenated products show improved fastness properties.

I claim:—

1. As new products the indigoid dyestuffs of the general formula:

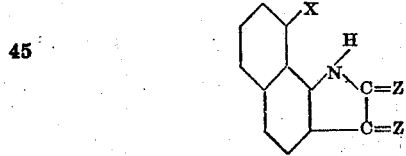

wherein X represents halogen, one Z stands for oxygen and the other Z for an organic residue containing the atom grouping

$C_1$ and $C_2$ being carbon atoms belonging to an aromatic or heterocyclic nucleus and wherein the aromatic nuclei of the general formula may be further substituted.

2. As new products the indigoid dyestuffs of the general formula:

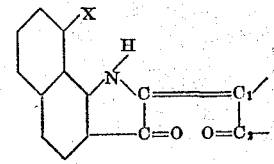

wherein X represents halogen, $C_1$ and $C_2$ carbon atoms belonging to an aromatic or heterocyclic nucleus and wherein the aromatic nuclei of the general formula may be further substituted.

3. As new products the indigoid dyestuffs of the general formula:

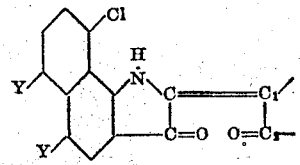

wherein Y represents hydrogen or halogen and $C_1$ and $C_2$ carbon atoms belonging to an aromatic or heterocyclic nucleus.

4. As a new product the indigoid dyestuff of the general formula:

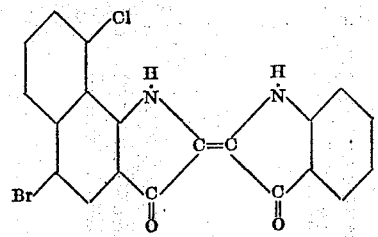

forming a yellow vat from which cotton is dyed greyish-blue shades.

In testimony whereof, I affix my signature.

JOSEF HALLER.